United States Patent

Mashiki

Patent Number: 6,058,701
Date of Patent: May 9, 2000

[54] EXHAUST PURIFICATION APPARATUS AND METHOD FOR INTERNAL COMBUSTION ENGINES

[75] Inventor: Zenichiro Mashiki, Toyota, Japan

[73] Assignee: Toyota Jidosha Kabushiki Kaisha, Toyota, Japan

[21] Appl. No.: 09/123,076

[22] Filed: Jul. 27, 1998

[30] Foreign Application Priority Data

Jul. 28, 1997 [JP] Japan ................................. 9-201512

[51] Int. Cl.$^7$ ................................................. F01N 3/00
[52] U.S. Cl. ............................... 60/285; 60/274; 60/297; 60/278; 123/295; 123/306
[58] Field of Search ............................. 60/285, 278, 297, 60/274, 301, 286; 123/430, 306, 307, 295, 305

[56] References Cited

U.S. PATENT DOCUMENTS

| | | | |
|---|---|---|---|
| 5,437,153 | 8/1995 | Takeshima et al. | 60/276 |
| 5,473,887 | 12/1995 | Takeshima et al. | 60/276 |
| 5,592,919 | 1/1997 | Morikawa | 123/435 |
| 5,740,669 | 4/1998 | Kinugasa et al. | 60/285 |
| 5,765,372 | 6/1998 | Mitobe et al. | 60/301 |
| 5,848,529 | 12/1998 | Katoh et al. | 60/274 |

FOREIGN PATENT DOCUMENTS

| | | |
|---|---|---|
| 6193487 | 7/1994 | Japan . |
| 8200045 | 8/1995 | Japan . |
| 7332071 | 12/1995 | Japan . |
| 8319862 | 12/1996 | Japan . |
| 8218918 | 8/1997 | Japan . |

Primary Examiner—Thomas Denion
Assistant Examiner—Binh Tran
Attorney, Agent, or Firm—Kenyon & Kenyon

[57] ABSTRACT

An exhaust purification apparatus for reducing nitrogen oxides in the exhaust gas emitted from an exhaust passage of an internal combustion engine. The catalyst is located in the exhaust passage. The catalyst occludes nitrogen oxides when the air fuel ratio of air-fuel mixture supplied to the combustion chamber is lean and reduces and emits the stored nitrogen oxides when the air-fuel ratio is rich. An ECU controls the air-fuel ratio of the air-fuel mixture to be rich when the nitrogen oxides stored in the catalyst is reduced and emitted. The ECU judges whether the engine operation is stable. The ECU permits use of the rich spike control only when the engine operation is stable.

17 Claims, 7 Drawing Sheets

EXHAUST PURIFICATION APPARATUS AND METHOD FOR INTERNAL COMBUSTION ENGINES

BACKGROUND OF THE INVENTION

The present invention relates to an exhaust purification apparatus for internal combustion engines. More particularly, the present invention pertains to an exhaust purification apparatus that has a nitrogen oxide storage-reduction catalyst in an exhaust passage.

In a typical engine, fuel is injected into an intake port from a fuel injector to charge a homogeneous mixture of fuel and air to the associated combustion chamber. An intake passage is opened and closed by a throttle valve, which is operated by manipulating an acceleration pedal. The opening of the throttle valve adjusts the intake air amount (and ultimately the amount of homogeneously mixed air and fuel) that is supplied to the combustion chambers of the engine. This controls engine power.

However, when performing homogeneous charge combustion, vacuum is produced by the throttling action of the throttle valve. The throttling increases energy loss due to pumping, which results when the mixture is drawn into the combustion chamber from the intake port. To attempt to solve this problem, stratified charge combustion has been proposed. In stratified charge combustion, the throttle valve is opened wide and fuel is supplied directly into each combustion chamber when the engine load is small. This provides a mixture having a relatively low air-fuel ratio in the vicinity of the ignition plug. As a result, the mixture is easier to ignite. Stratified charge combustion improves the fuel economy of the engine and decreases the energy loss of pumping.

As in stratified charge combustion, when an engine operates under a lean air-fuel ratio, a NOx storage-reduction catalyst apparatus is employed to purify nitrogen oxides, which are likely to be produced in the lean air-fuel ratio range. The main component of the catalyst apparatus is, for example, zeolite. It is presumed that zeolite temporarily adsorbs hydrocarbons in the exhaust, which reduces NOx in the exhaust. For example, Japanese Unexamined Patent Publication No 6-193487 discloses an apparatus having a NOx storage-reduction catalyst. The apparatus performs so-called rich spike control to reduce NOx. When the engine continues to be operated with a lean air-fuel ratio, NOx adsorbed on the catalyst reaches saturation, and the extra NOx is emitted in the exhaust gas. For this reason, the air-fuel ratio is controlled to be rich temporarily. The control increases the amount of HC in the exhaust gas and NOx is reduced to nitrogen gas ($N_2$).

Also, in the apparatus of the Japanese publication, a richness ratio is set to restrain the fluctuation of engine torque under rich spike control. The fuel injection amount is calculated to equalize engine torques before and after the rich spike control. That is, the engine torque under a lean air-fuel ratio, before the rich spike control starts, and the engine torque under a rich air-fuel ratio, when the rich spike control starts, are equalized.

However, in the apparatus of the Japanese publication, the following problems occur. When rich spike control is performed during unstable engine operation (for example, (1) when stratified charge combustion is changed to homogeneous charge combustion or (2) when air intake varies substantially), engine output fluctuation occurs and misfire can occur.

First, case (1) is described. Generally, when rich spike control is performed under homogeneous charge combustion, the fuel injection amount is increased and ignition timing is delayed. However, during stratified charge combustion, there is high air intake, and fuel must be substantially increased to make the air-fuel ratio rich. During stratified combustion, since the fuel density around the spark plug becomes too high because of the fuel increase, the same control method used with homogeneous combustion cannot be employed. When performing rich spike control, the fuel injection amount is increased and the openings of the throttle valve, swirl control valve (SCV) and exhaust gas recirculation (EGR) valve are narrowed, and pumping loss is increased. This limits the increase of engine torque. Rich spike control during stratified combustion is designed to make the combustion conditions similar to those of homogeneous charge combustion. Alternatively, the combustion control may be changed to homogeneous charge combustion. In other words, rich spike control must be performed during stratified charge combustion.

Accordingly, when the combustion control is being changed between stratified charge combustion and homogeneous charge combustion, the air intake amount is changing drastically. Under this state, rich spike control tend to cause power output fluctuation and misfires.

When the air intake amount simply changes (as in case (2)), the actual opening degree of the various valves (throttle valve, SCV, EGR valve) is likely to be different from the required opening degree. In that case, air intake conditions (air-fuel ratio, swirl strength, EGR amount) tend to differ significantly from the required conditions. When rich spike control is performed under these circumstances, power output fluctuation and misfires tend to occur.

SUMMARY OF THE INVENTION.

The objective of the present invention is to provide an exhaust purification apparatus for internal combustion engines. The apparatus limits output fluctuation when performing rich spike control, and prevents misfires.

To achieve the above objective, the present invention provides an exhaust purification apparatus for reducing nitrogen oxides in the exhaust gas emitted from an exhaust passage of an internal combustion engine. The apparatus includes a catalyst, a rich spike controller, a determiner, and a permitting means. The catalyst is located in the exhaust passage. The catalyst stores nitrogen oxides when the air fuel ratio of air-fuel mixture supplied to the combustion chamber is lean and reduces and emits the stored nitrogen oxides when the air-fuel ratio is rich. The rich spike controller that controls the air-fuel ratio of the air-fuel mixture to be rich when the nitrogen oxides stored in the catalyst is reduced and emitted. The determiner judges whether the engine operation is stable. The permitting means permits use of the rich spike controller only when the engine operation is judged to be stable by the determiner.

The present invention also provides a method of exhaust purification for reducing nitrogen oxides in the exhaust gas, which is discharged from the exhaust passage of the internal combustion engine having a catalyst to selectively store and reduce the nitrogen oxides. The method includes the following steps. A step of storing nitrogen oxides by the catalyst when the air-fuel ratio of an air-fuel mixture supplied into the engine combustion chamber is lean. A step of judging whether the catalyst has stored more than a predetermined amount of nitrogen oxides. A step of judging whether the engine operation is stable. A step of controlling the air-fuel ratio to make the air-fuel mixture rich only when the amount of the stored nitrogen oxides is more than a predetermined amount and the engine operation is judged stable, so that the stored nitrogen is reduced and emitted.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

First Embodiment

A first embodiment of an exhaust purification apparatus according to the present invention will now be described in reference to the drawings. As in FIG. 1, a cylinder injection type engine 1 has, for example, four cylinders 1a. The combustion chamber structure of each cylinder 1a is shown in FIG. 2. Pistons are accommodated in a cylinder block 2 of the engine 1, to reciprocate in corresponding cylinders 1a. A cylinder head 4 is provided on the top of the cylinder block 2, and a combustion chamber 5 is formed between the piston and the cylinder head 4. Each cylinder 1a includes four valves including a first intake valve 6a, a second intake valve 6b, and a pair of exhaust valves 8. Four ports are formed in association with each cylinder 1a of cylinder head 4, each port being associated with one of the valves 6a, 6b, and 8. The four ports include a first intake port 7a corresponding to the first intake valve 6a, a second intake port 7b corresponding to the second intake valve 6b, and a pair of exhaust ports 9 corresponding to the pair of exhaust valves 8, respectively.

As shown in FIG. 2, a helical type port is employed as the first intake port 7a. A straight port, which extends generally straight, is employed as the second intake port 7b. An ignition plug 10 is provided on the inner wall of the cylinder head 4, to face each combustion chamber 5. A high voltage from an ignitor 12 is applied to the ignition plug 10 by way of a distributer (not shown). The ignition timing of the ignition plug is determined by the output timing of the high voltage from the ignitor 12. A fuel injector 11 is arranged to face each combustion chamber 5, in the vicinity of the first and second intake valves 6a, 6b on the inner wall of the cylinder head 4. Each injector directly injects fuel in the combustion chamber 5 of the corresponding cylinder 1a.

Figure 1:
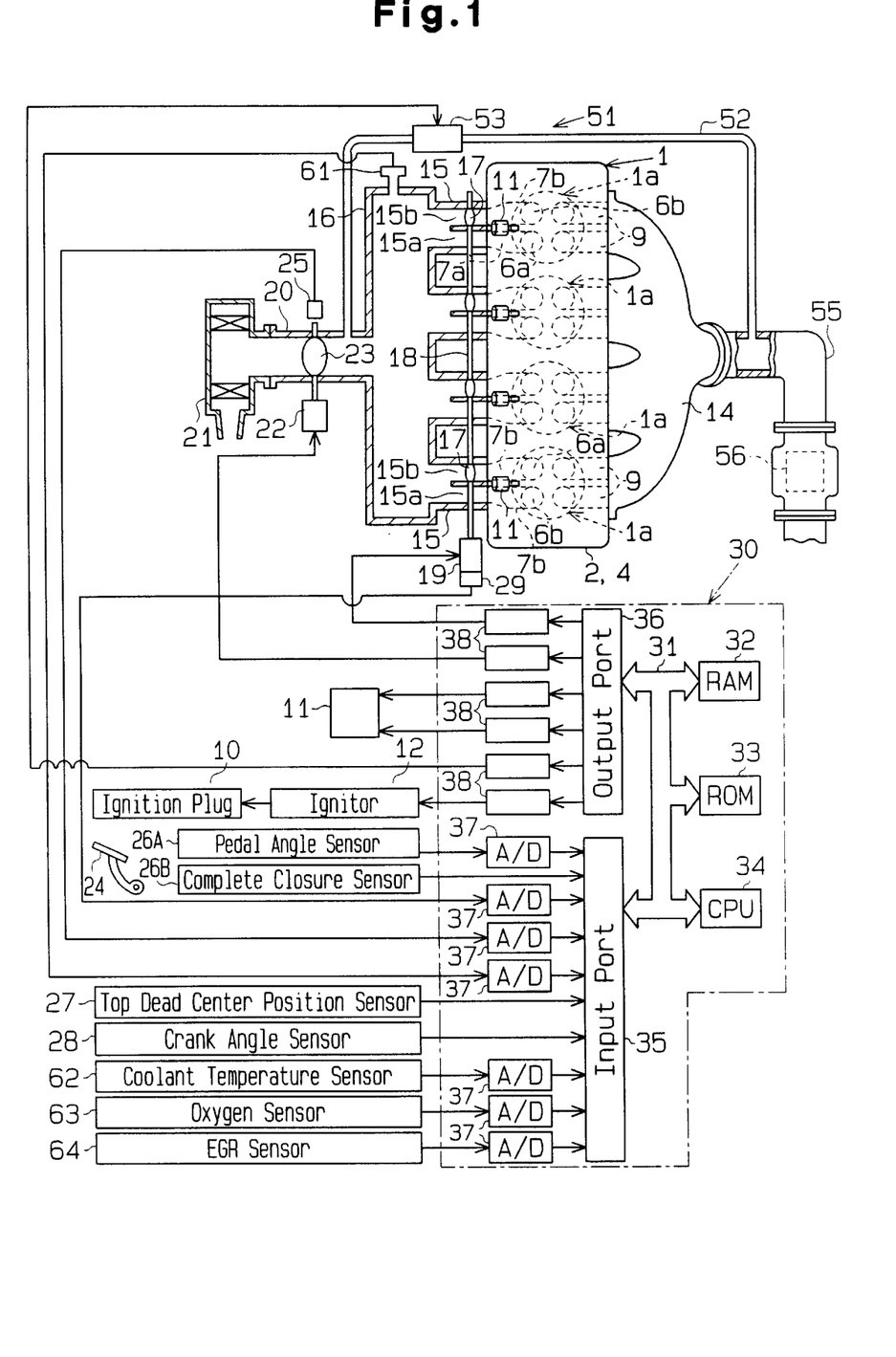
FIG. 1 is a schematic view showing an engine exhaust purification apparatus according to a first embodiment of the present invention.
Figure 2:
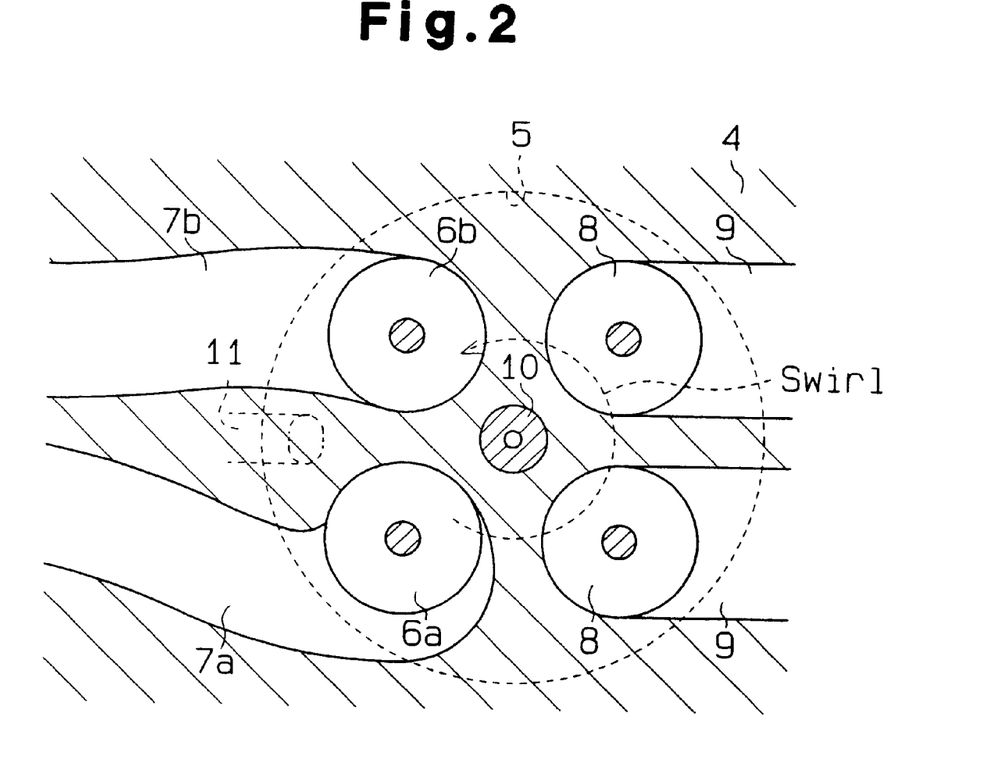
FIG. 2 is an enlarged sectional view showing a cylinder of the engine.

As shown in FIG. 1, the first and second intake ports 7a, 7b of each cylinder 1a are connected to a surge tank 16, by way of first and second intake passages 15a, 15b, respectively, formed in an intake manifold 15. A swirl control valve (SCV) 17 is located in each second intake passage 15b. The swirl control valves 17 are connected to, for example, a step motor 19 by way of a common shaft 18. The step motors 19 open and close the swirl control valves 17 based on output signals from an electronic control unit (called ECU hereafter) 30. The swirl control valve 17 may also be controlled according to vacuum pressure (negative pressure) of the intake ports 7a, 7b instead of the step motor 19.

The surge tank 16 is connected to an air cleaner 21 through an intake duct 20. The intake duct 20 includes an electronically controlled throttle valve 23, which is selectively opened and closed by the step motor 22. The step motor 22 selectively opens and closes the throttle valve 23 based on an output signal from the ECU 30. The motion of the throttle valve 23 controls the air intake amount introduced through the intake duct 20 to each combustion chamber 5. The intake duct 20, the surge tank 16, the first and second intake passages 15a, 15b constitutes an air intake passage. A throttle sensor 25 is located in the vicinity of the throttle valve 23 to detect the throttle opening degree.

An exhaust manifold 14 is connected to a pair of the exhaust ports 9 of each cylinder 1a. The exhaust gases produced by the combustion in each combustion chamber are discharged to an exhaust duct 55 through the exhaust manifold 14. The exhaust manifold 14 and the exhaust duct 55 constitute a discharging passage.

The engine 1 has a well known exhaust gas recirculation (EGR) apparatus 51. The EGR apparatus 51 includes an EGR passage 52 and an EGR valve 53 located in the passage 52. The EGR passage 52 connects the intake duct 20, which is located downstream of the throttle valve 23, with the exhaust duct 55. The EGR valve 53 includes a valve seat, a valve body, and a step motor (any of these not shown). The step motor intermittently displaces the valve body with respect to the valve seat, and this changes the opening degree of the EGR valve 53. When the EGR valve is open, some of the exhaust gas in the exhaust duct flows to the intake duct 20 through the EGR passage 52. Accordingly, a some of the exhaust gas is mixed with the intake air. The EGR valve 53 adjusts the recirculated amount of the exhaust gas.

The exhaust duct 55 includes a nitrogen oxide storage-reduction catalyst 56. Nitrogen oxides (NOx) in the exhaust gas is stored in the catalyst 56 basically when the air-fuel ratio is lean. When the air-fuel ratio becomes rich, HC in the exhaust gas increases and the stored NOx in the catalyst 56 is reduced to nitrogen gas ($N_2$), which is discharged in the air.

The ECU 30 includes a digital computer. The ECU 30 has a RAM (random access memory) 32, ROM (read only memory) 33, CPU (central processing unit) 34, or micro processor, an input port 35, and an output port 36, which are connected by a two-way bus 31.

An accelerator pedal 24 is connected to a pedal angle sensor 26a, which generates an output voltage in proportion to the depression amount of the pedal 24. The output voltage of the pedal angle sensor 26A is input to the CPU 34 through an AD converter and the input port 35. The accelerator pedal 24 includes a complete closure switch 26B, which detects the state where the accelerator pedal is not depressed, that is, the depression amount of the pedal 24 is zero. The switch 26B sends a signal of one when the accelerator pedal 24 is not depressed, and zero when the pedal 24 is depressed, to the CPU 34 through the input port 35.

A top dead center sensor 27 sends pulse signals to the CPU 34 through the input port 35, for example, when the piston in the first cylinder 1a reaches top dead center for its intake stroke. A crank sensor 28 sends a pulse signal to the CPU 34 through the input port 35 every time a crank shaft rotates, for example, 30° C.A (crank angle).

A swirl control valve sensor 29 detects the rotation angle of a shaft 18 to measure the opening degree (SCV opening degree) SN of the swirl control valve 17. The swirl control valve sensor 29 sends a signal based on the detected rotation angle, to the CPU 34 through an A/D converter 37 and the input port 35. The throttle sensor 25 detects the throttle opening degree TN and sends a signal based on the opening degree, to the CPU 34 through the A/D converter 37 and the input port 35.

An intake pressure sensor 61 detects the pressure in the surge tank 16 (intake pressure PIM). A water temperature sensor 62 detects the temperature of the liquid engine coolant (coolant temperature THW).

An oxygen sensor 63 is located upstream of the exhaust duct 55 with respect to the nitrogen oxide storage-reduction catalyst 56. The oxygen sensor 63 detects the oxygen density OX in the exhaust gas. The oxygen sensor 63 suddenly changes its output voltage in the vicinity of a theoretical air-fuel ratio. The voltage output thus indicates the air-fuel ratio A/F. An EGR sensor 64 is located in the vicinity of the EGR valve 53 to detect the opening degree (EGR opening degree) EN of the valve 53. These sensors 61 to 64 send signals, based on the detected values, to the CPU 34 through the A/D converter 37 and the input port 35.

The output port 36 is connected to each step motors 19, 22, an ignitor 12, a step motor of the EGR valve through a corresponding drive circuit 38. The ECU 30 properly controls the fuel injector 11, the step motors 19, 22, the ignitor 12 and the EGR valve 53, based on the signals sent from sensors 25 to 29, 61 to 64, according to a control program stored in the ROM 33.

Figure 3:
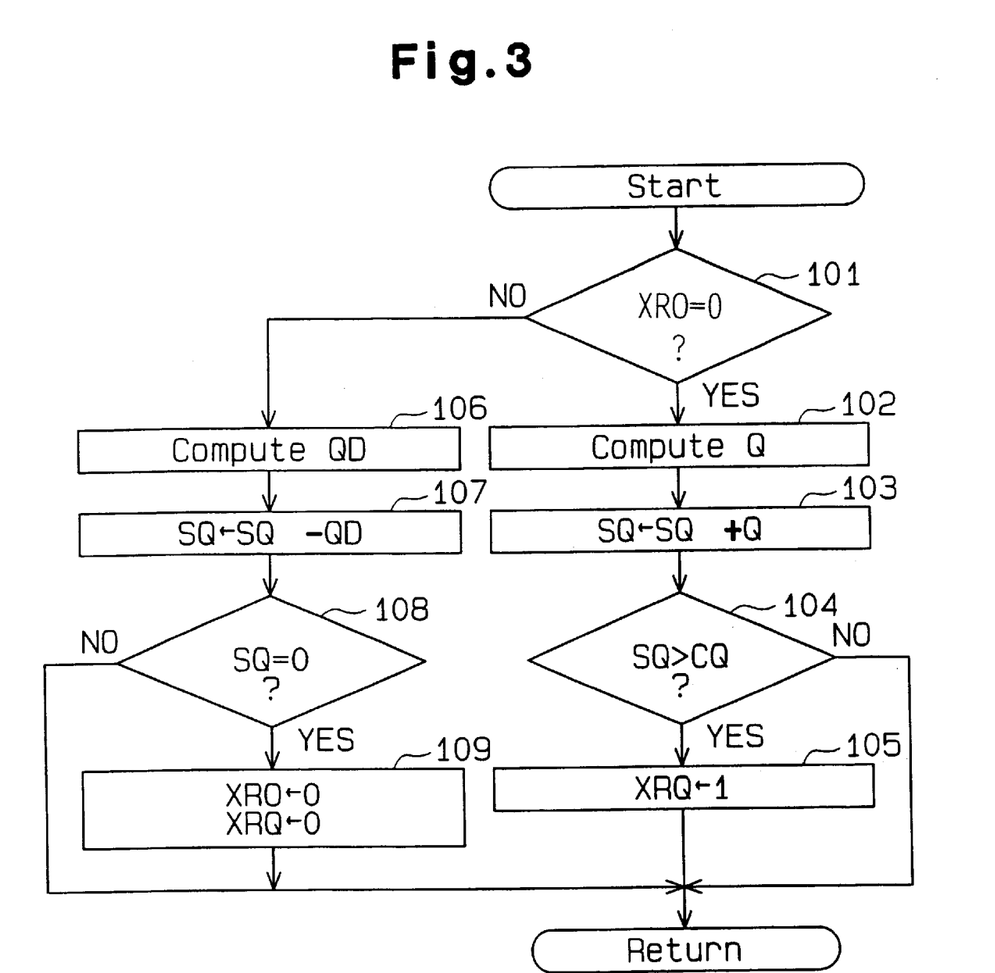
FIG. 3 is a flowchart of a routine for setting flags to require rich spike control.

Various controls executed in the above exhaust purification apparatus will now be explained in reference to a flowchart. FIG. 3 is a flowchart of a routine for setting a flag to require a rich spike. The routine determines whether to set a rich spike requiring flag XRQ, which indicates whether to request that the nitrogen oxide (NOx) stored in the catalyst 56 be reduced and discharged. The flowchart is executed by the ECU 30 by an interruption at predetermined crank angle intervals (for example, 180° C.A).

When the routine of FIG. 3 is executed, the ECU 30 judges whether the rich spike execution flag XRO is zero at step 101. The execution flag XRO indicates whether to actually execute the rich spike control or not. That is, the flag is set to one when executing the rich spike control and to zero otherwise. When the execution flag XRO is zero, the ECU 30 judges that rich spike control is not being executed and the catalyst 56 continues storing NOx, and then the ECU 30 moves on to step 102.

At step 102, the ECU 30 calculates the NOx storage amount Q of the catalyst 56 per unit time under the present operation of the engine 1. The storage amount Q is computed from predetermined function data using parameters such as engine speed NE and fuel injection amount.

At step 103, the ECU 30 adds the storage amount Q calculated at step 102 to a present synthetic storage amount SQ, thus renewing the synthetic storage amount SQ.

At step 104, the ECU 30 judges whether the present synthetic storage amount is greater than a predetermined limit value CQ. The limit value CQ is a value indicating a maximum or near maximum amount of NOx storage by the catalyst 56. When the storage amount SQ is not over the limit value CQ, the ECU 30 temporarily terminates the process. On the other hand, when the storage amount SQ is over the limit value CQ, the ECU goes on to step 105.

At step 105, the ECU 30 sets the rich spike requiring flag XRQ to one to reduce NOx stored in the catalyst 56 and then temporarily terminates the routine.

When the rich spike execution flag XRO is not zero or when it is one at step 101, the ECU 30 goes on to step 106, judging that the rich spike control is being executed and NOx stored in the catalyst 56 is being reduced and discharged.

At step 106, the ECU 30 calculates a NOx reduction amount QD per unit time of the catalyst 56 under the present operating conditions of the engine 1. The NOx is calculated using predetermined function data, based on the present engine conditions (for example, engine speed and load) or air-fuel ratio.

At step 107, the ECU 30 renews the synthetic storage amount SQ by subtracting the reduction amount QD calculated at step 106 from the present synthetic storage amount SQ.

At step 108, ECU 30 judges whether the present synthetic storage amount SQ is zero. If the storage amount is not zero, the ECU temporarily terminates the routine. On the other hand, when the storage amount SQ is zero, since there is no need to continue the rich spike control, the ECU 30 goes to step 109.

At step 109, the ECU 30 sets the execution flag XRO to zero and the requiring flag XRQ to zero and temporarily terminates the routine.

As explained above, in the routine of FIG. 3, a rich spike requiring flag XRQ is set in accordance with the synthetic storage amount SQ.

Figure 4:
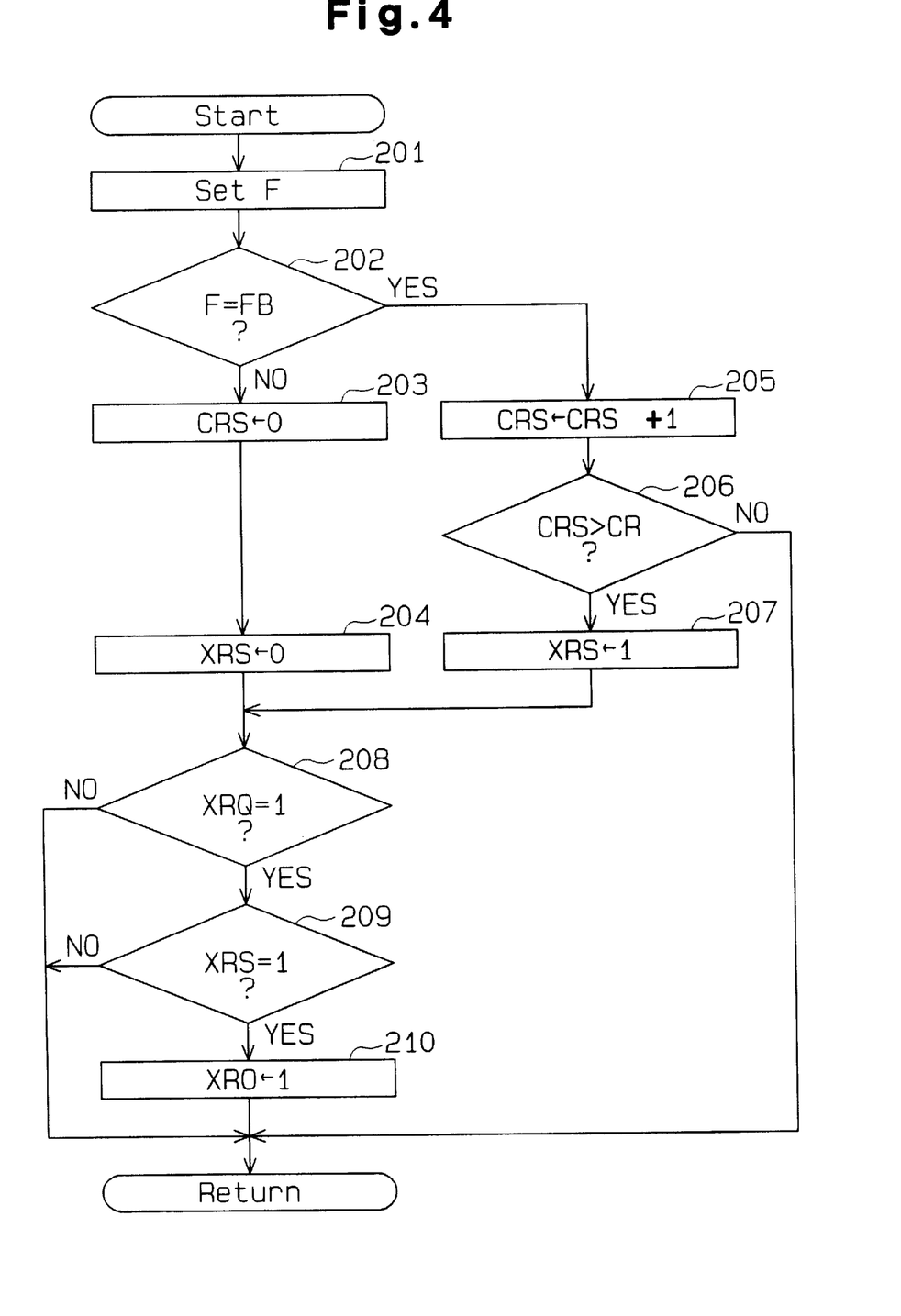
FIG. 4 is a flowchart of a routine for executing rich spike control.

A control process for judging whether or not to finally execute the rich spike control will now be explained referring to FIG. 4. FIG. 4 is a flowchart of a rich spike control execution routine, which is executed by the ECU 30 by interruption at predetermined time intervals.

Figure 5:
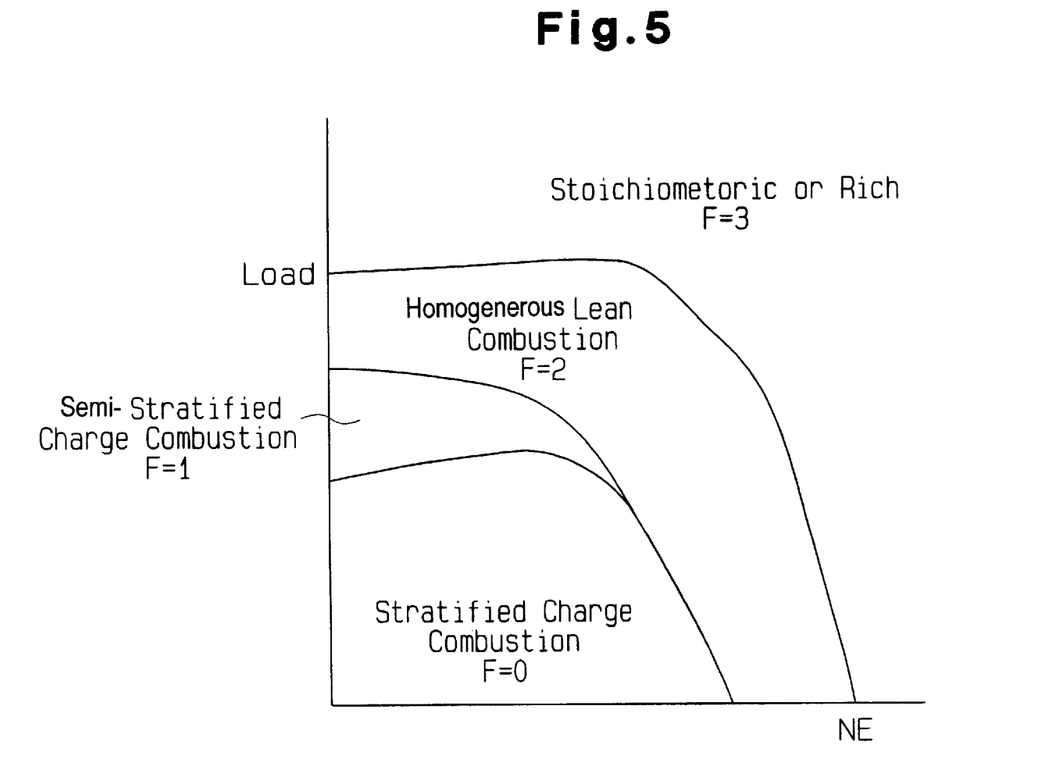
FIG. 5 is a map to determine various combustion modes in accordance with engine speed and load.

In the routine of FIG. 4, first, at step 201, the ECU 30 sets a combustion mode F based on the current engine operation conditions. In this embodiment, the combustion mode F is set according to a map shown in FIG. 5. The map shows function data, wherein the combustion mode F is determined according to the engine speed NE and load. The combustion mode F is set at either stratified charge combustion (F=0), semi-stratified charge combustion (F=1), homogeneous lean combustion (F=2), or stoichiometric or rich air-fuel ratio homogeneous charge combustion (F=3).

At step 202, the ECU 30 judges whether the presently set combustion mode F has changed from the previous combustion mode F3. When the present combustion mode changes, the value (CRS) of a mode counter is cleared, or set to zero at step 203. The value CRS indicates the duration of a combustion mode F.

At step 204, immediately after the combustion mode F is changed, the air intake conditions (air-fuel ratio, swirl strength, EGR amount) are unstable. To prevent rich spike control, the ECU 30 sets a flag XRS to zero for permitting rich spike control, then the processing moves on to step 208.

On the other hand, at step 202, when the present combustion mode F remains unchanged from the previous combustion mode FB, the ECU 30 moves on to step 205. At step 205, the ECU 30 increments the count value CRS by one.

At step 206, the ECU 30 judges whether the count value CRS exceeds a predetermined time CR. The predetermined time CR is the time that the system takes to stabilize, and the time CR may be a predetermined fixed value or it may be set according to the operation speed of each valve (throttle valve 23, swirl control valve 17, EGR valve 53) when the combustion mode changes. When the count value CRS is equal to or below the predetermined time CR, the ECU 30 temporarily terminates the routine. When the count value CRS is beyond the time CR, the ECU 30 judges that the air intake condition is stable and moves on to step 207.

At step 207, the ECU 30 sets the rich spike permission flag XRS to one and moves on to step 208.

At step 208, coming from either step 204 or step 207, the ECU 30 judges whether the requiring flag XRQ, which is set by the routine in FIG. 3, is one. When the requiring flag XRO is not one but zero, there is no need to execute rich spike control. Then, the ECU 30 does not change the value of the execution flag XRO and temporarily terminates the routine.

On the other hand, when the requiring flag XRQ is one, the ECU 30 judges whether the permitting flag XRS is one. When the permitting flag is not one but zero, the ECU 30 does not change the value of the execution flag XRO and temporarily terminates the routine, judging that the rich spike control should not be performed since the air intake condition is unstable even though rich spike control is required.

However, when the rich spike permitting flag XRS is one, rich spike control is both required and permitted because the air intake condition is stable, and then the ECU 30 moves on to step 210. At step 210, the ECU 30 sets the execution flag XRO to one and temporarily terminates the routine. In this case, rich spike control is actually executed.

The advantages of the present embodiment will now be described.

When the synthetic storage amount SQ is over the limit value CQ, it is necessary to reduce the NOx stored in the catalyst, so the rich spike requiring flag XRQ is set to one. However, as long as the rich spike permitting flag XRS is not set to one, that is, as long as the air intake condition is unstable, rich spike control is not performed.

Especially when the combustion mode F of the engine 1 is changed, rich spike control is not permitted. This is because the air intake condition is often unstable when the combustion mode F is changed. Accordingly, combustion problems caused by performing rich spike control when the combustion mode F changes are avoided. As a result, power output fluctuation and misfires are prevented.

Rich spike control is not only prohibited when the combustion mode F changes but is further prohibited until a predetermined time CR elapses. This is because the air intake condition is often unstable until the predetermined time CR elapses. In this case also, the problems caused by performing rich spike control are avoided.

Second Embodiment

A second embodiment of the present invention will now be described.

To avoid a redundant description, like or same reference numerals are given to components that are like or the same as the corresponding components of the first embodiment.

In the first embodiment, the rich spike control is not permitted when the combustion mode changes and before the predetermined time elapses after the change. Contrary to this, in the second embodiment, rich spike control is not performed when the air intake amount changes by more than the predetermined amount.

Figure 6:
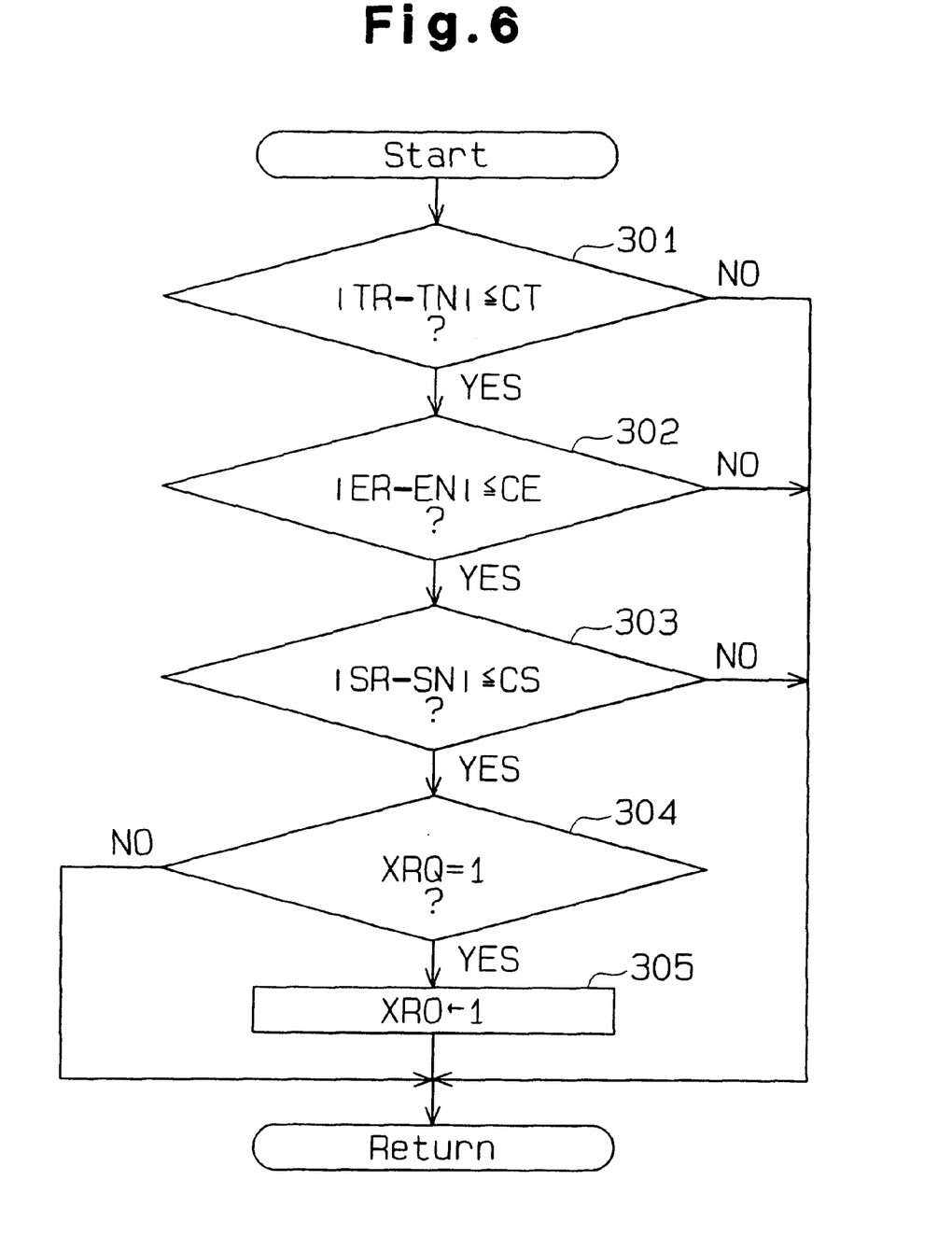
FIG. 6 is a flowchart of a routine for executing rich spike control according to a second embodiment of the present invention.

Accordingly, the routine in FIG. 3 is also executed in the second embodiment, but the standard for judging whether to permit the execution of the rich spike control is different from that of the first embodiment. A routine for executing the rich spike control will be explained in reference to FIG. 6. FIG. 6 is a flowchart showing the routine for executing the rich spike control. The routine is executed by the ECU 30 by interruption at predetermined time intervals.

First, at step 301, the ECU 30 calculates the difference between a required throttle opening degree TR calculated according to the engine 1 operation by another routine and a throttle opening degree TN actually detected by the throttle sensor 25. The ECU 30 judges whether the difference is below the predetermined value CT. When the difference is more than the value CT, the air intake condition is deemed unstable. Thus, the ECU 30 judges that rich spike control should not be performed and temporarily terminates the routine keeping the execution flag XRO at zero. On the other hand, when the difference is equal to or below the value CT, the air intake through the throttle valve 23 is relatively stable, and the ECU 30 moves on to step 302.

At step 302, the ECU 30 calculates the difference between the required EGR opening degree ER, which is calculated by another routine according to the engine 1 operation, and the EGR opening degree EN actually detected by the EGR sensor 64. The ECU 30 judges whether the difference is less than the predetermined value CE. When the difference is more than the value CE, the air intake condition is deemed unstable, and the ECU 30 temporarily terminates the routine keeping the execution flag XRO at zero. On the other hand, when the difference is equal to or below the value CE, the air intake through the EGR valve 53 is relatively stable and the ECU 30 moves on to step 303.

At step 303, the ECU 30 calculates the difference between the required SCV opening degree SR, which is calculated by another routine according to engine 1 operation, and the SCV opening degree SN actually detected by the swirl control valve sensor 29. The ECU 30 judges whether the difference is equal to or below the predetermined value CS. When the difference is more than the value CS, the air intake is deemed unstable, and the ECU 30 temporarily terminates the routine, keeping the execution flag XRO at zero. On the other hand, when the difference is equal to or below the value CE, the air intake through the swirl control valve 17 is relatively stable, and the ECU 30 moves on to step 304.

At step 304, the ECU 30 judges whether the requiring flag XRQ set by the routine in FIG. 3 is one. When the flag XRQ is not one but zero, there is no need to execute rich spike control, and the ECU 30 temporarily terminates the routine, keeping the execution flag XRO at zero. On the other hand, at step 305, when the flag XRQ is one, the ECU 30 permits rich spike control and sets the execution flag XRO to one to execute rich spike control and then temporarily terminates the routine. Accordingly, in this case, the rich spike control is actually executed.

As explained above, in the second embodiment, rich spike control is prevented when there is a predetermined difference between the required opening degree of each valve 23, 53, 17 and the actual opening degree because the air intake condition or the air intake amount is deemed unstable. This prevention of rich spike control avoids the problems of engine combustion, power output fluctuation, and misfires.

Third Embodiment

A third embodiment of the present invention will now be described. In the third embodiment, the construction is similar to that of the first embodiment, and the same numerals are used to refer to the same or similar members.

The following description will concentrate on the differences from the first and second embodiment.

In the second embodiment, rich spike control is either executed or prevented in accordance with the difference between the required opening degree of each valve and the actual opening degree. However, in the third embodiment, rich spike control is prevented when the fluctuation of an accelerator opening ACCP is sharp.

Figure 7:
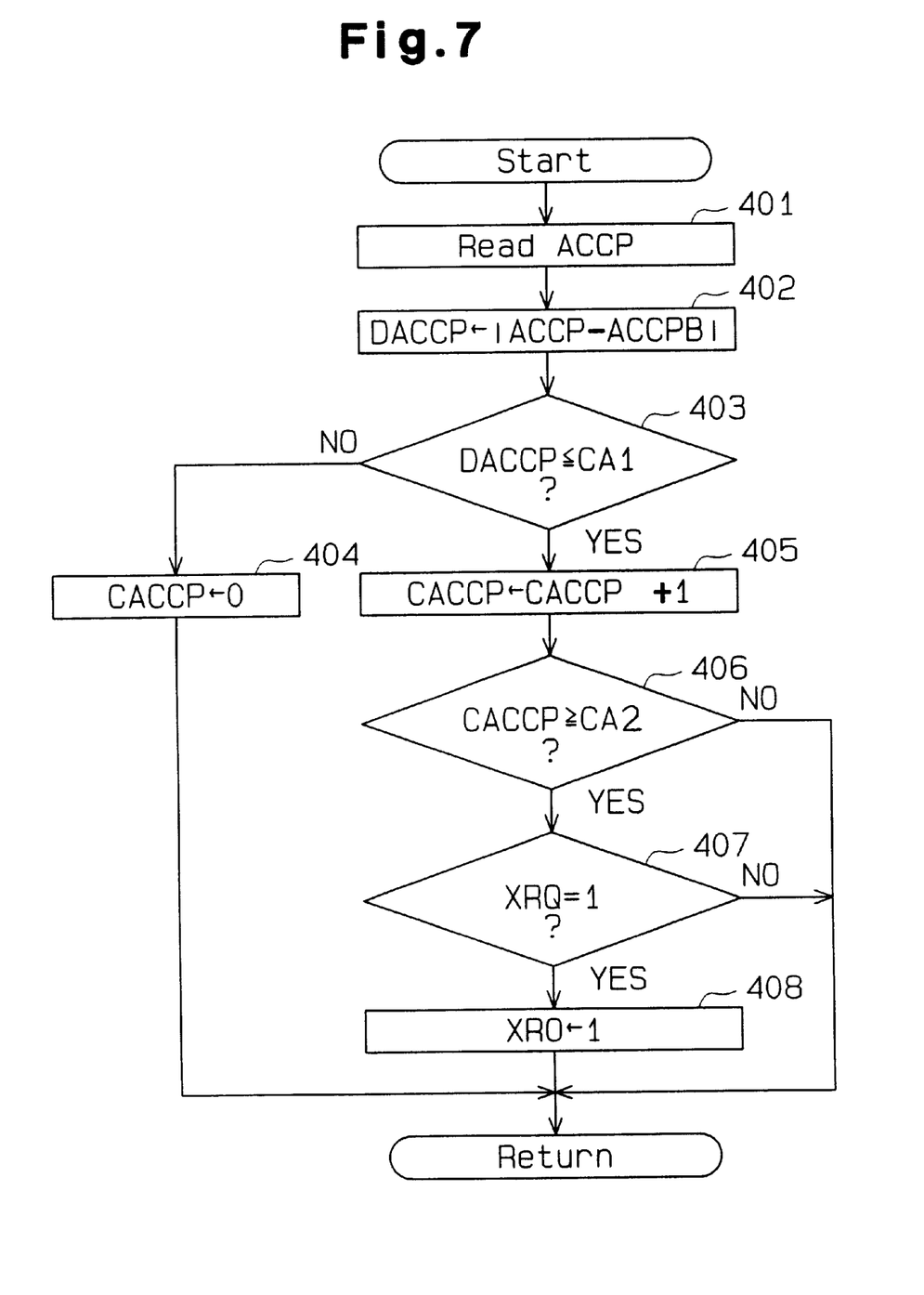
FIG. 7 is a flowchart of a routine for executing rich spike control according to a third embodiment of the present invention.

Accordingly, also in the present embodiment, the ECU 30 judges whether rich spike control should be permitted or not after the routine in FIG. 3 is executed. FIG. 7 is a flowchart showing a routine for executing the rich spike control executed by the ECU 30 by interruption at predetermined time intervals.

When the processing moves to the routine, first at step 401, the ECU reads out the accelerator opening degree ACCP based on the detection by the accelerator sensor 26A.

At step 402, the ECU 30 subtracts the previous accelerator opening degree ACPB from the present opening degree ACCP and sets the absolute value of the difference as an accelerator change amount DACCP.

At step 403, the ECU 30 judges whether the accelerator change amount DACCP is equal to or below the predetermined standard value CA1. When the change amount DACCP is over the standard value CA1, the air intake is deemed unstable, and the ECU 30 moves on to step 404 judging that rich spike control should not be executed. At step 404, the ECU 30 sets a count value CACCP of accelerator stabilization counter to zero, and then temporarily terminates the routine, keeping the rich spike execution flag XRO at zero. The count value CACCP indicates the period while the accelerator opening degree is stable. On the other hand, when the change amount DACCP is equal to or below the standard value CA1, the air intake is stable, and the ECU 30 moves the processing to step 405.

At step 405, the ECU 30 increments the count value CACCP of the accelerator stabilization counter by one.

At step 406, the ECU judges whether the count value CACCP is equal to or more than the standard value CA2. When the count value CACCP is less than the standard value CA2, the ECU temporarily terminates the routine. On the other hand, when the count value CACCP is equal to or more than the standard value CA2, that is, when the air intake is stable, the ECU 30 moves to step 407.

At step 407, the ECU 30 judges whether the requiring flag XRQ set by the routine in FIG. 3 is one. When the requiring flag XRQ is not one but zero, there is no need to execute rich spike control, and the ECU 30 temporarily terminates the routine, with the execution flag XRO kept at zero. On the other hand, when the requiring flag XRQ is one, the ECU 30 permits rich spike control at the following step 408 and sets the execution flag XRO to one to execute rich spike control and then terminates the routine. Accordingly, in this case, rich spike control is actually executed.

As described above, the air intake condition is judged according to the accelerator change amount DACCP, and rich spike control is either permitted or prevented. When the change amount DACCP is large, the air intake amount is deemed unstable, and the problems of the engine combustion are avoided by preventing rich spike control. This restrains power output fluctuation of the engine 1 and prevents misfires.

It should be apparent to those skilled in the art that the present invention may be embodied in many other specific forms without departing from the spirit or scope of the invention. Particularly, it should be understood that the invention may be embodied in the following forms.

The engine 1 may include a passage to bypass the throttle valve 23 and a valve that is located in the passage to control the idle speed.

The present invention may be embodied in a common stratified charge combustion engine, or a semi-stratified charge engine instead of the cylinder injection type engine 1. For example, the invention may be employed in a type of engine that injects fuel towards the upper side of the intake valves 6a, 6b of intake ports 7a, 7b. In the above embodiments, the fuel injector 11 is located in the vicinity of the intake valves 6a, 6b, however the position of the injector is not so limited. The present invention may also be embodied in an engine using lean burn or stoichiometric combustion and in other engines such as diesel engines instead of the gasoline engine 1.

In the above embodiments the engine 1 has a helical intake port to generate swirls, however swirls need not be produced. In that case, for example, the swirl control valve 17 and the step motor 19 may be omitted.

In the first embodiment, rich spike control is prevented until the predetermined time elapses after the combustion mode F changes. However, rich spike control may be permitted in some cases soon after the combustion mode changes.

In the second and third embodiments, the change of the air intake amount is detected according to the operation condition of each actuator valve 23, 24, 17, 53, however, the air intake amount downstream of the throttle valve 23 may be directly measured.

Therefore, the present examples and embodiments are to be considered as illustrative and not restrictive and the invention is not to be limited to the details given herein, but may be modified within the scope and equivalence of the appended claims.

What is claimed is:

1. An exhaust purification apparatus for reducing nitrogen oxides in an exhaust gas emitted from an exhaust passage of an internal combustion engine, the apparatus comprising:

a catalyst located in the exhaust passage, wherein the catalyst stores nitrogen oxides when the air-fuel ratio of an air-fuel mixture supplied to a combustion chamber is lean and reduces and emits the stored nitrogen oxides when the air-fuel ratio is rich;

a rich spike controller that controls the air-fuel ratio of the air-fuel mixture to be rich when the nitrogen oxides stored in the catalyst is reduced and emitted;

a determiner for judging whether the engine is operating in a stable manner;

a changer for choosing among different combustion types and changing the engine combustion type according to varying loads on the engine; and a permitting means for permitting use of the rich spike controller only when the engine is judged to be operating in a stable manner by the determiner;

wherein the determiner judges that the engine is operating in an unstable manner when the engine combustion type is being changed by the changer.

2. The apparatus according to claim 1, wherein the determiner judges that the engine is operating in a stable manner when a predetermined time elapses after the engine combustion type is changed.

3. The apparatus according to claim 1, wherein the combustion types include stratified charge combustion and homogeneous charge combustion, wherein the air-fuel mixture is unevenly distributed in the combustion chamber during stratified charge combustion, and the air-fuel mixture is homogeneous in the combustion chamber during homogeneous charge combustion, and wherein the changer changes the engine combustion type at least between stratified charge combustion and homogeneous charge combustion.

4. The apparatus according to claim 1 further including a detector for detecting a rate of change of the air intake amount into the combustion chamber, wherein the determiner judges that the engine is operating in an unstable manner when the air intake rate changes by more than a predetermined amount.

5. The apparatus according to claim 4 further including an actuator for changing the air intake amount, wherein the detector detects the rate of change of the air intake amount based on the condition of the actuator.

6. An exhaust purification apparatus for reducing nitrogen oxides in an exhaust gas emitted from an exhaust passage of an internal combustion engine, the apparatus comprising:

a catalyst located in the exhaust passage wherein, the catalyst stores nitrogen oxides when the air-fuel ratio of an air-fuel mixture supplied to a combustion chamber is lean and reduces and emits the stored nitrogen oxides when the air-fuel ratio is rich;

a rich spike controller that controls the air-fuel ratio of the air-fuel mixture to be rich when the nitrogen oxides stored in the catalyst is reduced and emitted;

a determiner for judging whether the engine is operating in a stable manner;

a permitting means for permitting use of the rich spike controller only when the engine is judged to be operating in a stable manner by the determiner; and an actuator for changing the air intake amount into the combustion chamber;

wherein the determiner judges that the engine is operating in an unstable manner when the difference between the present condition of the actuator and a required condition of the actuator according to the engine operation condition is above a predetermined value.

7. The apparatus according to claim 6, wherein the actuator includes a throttle valve located in an air intake passage.

8. The apparatus according to claim 6, the apparatus further including a circulator for returning exhaust gas to an air intake passage, wherein the circulator includes an EGR passage connecting the exhaust passage with the air intake passage and an EGR valve to adjust the amount of exhaust gas returned through the EGR passage, and wherein the actuator includes the EGR valve.

9. The apparatus according to claim 6, wherein the engine further includes a swirl control valve for controlling the size of a swirl generated in the air introduced into the combustion chamber, and wherein the actuator includes the swirl control valve.

10. The apparatus according to claim 6 further including:

an air intake passage for introducing air into the combustion chamber;

a throttle valve located in the intake passage;

an EGR passage for connecting the exhaust passage with the intake passage;

an EGR valve for adjusting the amount of exhaust gas circulated through the EGR passage;

a swirl control valve for controlling the size of swirls generated in the air introduced into the combustion chamber; and, at least one detector for detecting the opening degree of each valve, wherein the determiner judges that the engine operation condition is stable when the difference between the detected opening degree of each valve and opening degree that is required according to the engine operation condition is equal to or below a predetermined value.

11. An exhaust purification apparatus for reducing nitrogen oxides in an exhaust gas emitted from an exhaust passage of an internal combustion engine, the apparatus comprising:

a catalyst located in the exhaust passage, wherein the catalyst stores nitrogen oxides when the air-fuel ratio of an air-fuel mixture supplied to a combustion chamber is lean and reduces and emits the stored nitrogen oxides when the air-fuel ratio is rich;

a rich spike controller that controls the air-fuel ratio of the air-fuel mixture to be rich when the nitrogen oxides stored in the catalyst is reduced and emitted;

a determiner for judging whether the engine is operating in a stable manner;

a permitting means for permitting use of the rich spike controller only when the engine is judged to be operating in a stable manner by the determiner;

an accelerator pedal operated by a driver; and a detector for detecting a rate of change of the accelerator pedal depression amount, wherein the determiner judges that the engine is operating in a unstable manner when the rate of change of the accelerator pedal depression amount is greater than a predetermined rate.

12. The apparatus according to claim 11, wherein the determiner judges that the engine is operating in a stable manner when the rate of change of the accelerator pedal depression amount is equal to or below a predetermined amount for a time that is equal to or greater than a predetermined time.

13. A method of exhaust purification for reducing nitrogen oxides in the exhaust gas emitted from an exhaust passage of an internal combustion engine having a catalyst to selectively occlude and reduce the nitrogen oxides, the method comprising the steps of:

occluding nitrogen oxides by the catalyst when the air-fuel ratio of an air-fuel mixture supplied into the engine combustion chamber is lean;

judging whether the catalyst has stored more than a predetermined amount of nitrogen oxides;

judging whether the engine is operating in a stable manner;

choosing and changing between stratified charge combustion and homogeneous charge combustion; and controlling the air-fuel ratio to make the air-fuel mixture rich only when the stored nitrogen oxides is more than a predetermined amount and the engine operation is judged stable, so that the stored nitrogen oxides is reduced and emitted;

wherein the step of judging stability includes judging that the engine is operating in an unstable manner when the engine is changing between combustion types.

14. The method according to claim 13, wherein the step of judging stability includes judging that the engine is operating in a stable manner when a predetermined time has elapsed after the engine combustion type has changed.

15. The method according to claim 13, the method further including a step of detecting the change amount per unit time of air drawn into the combustion chamber, wherein the step of judging stability includes judging that the engine is operating in an unstable manner when a detected rate if change of the air intake amount is greater than a predetermined amount.

16. The method according to claim 15, wherein the step of detecting includes detecting the rate of change of the air intake amount based on the operation condition of an actuator for changing the air intake amount.

17. A method of exhaust purification for reducing nitrogen oxides in the exhaust gas emitted from an exhaust passage of an internal combustion engine having a catalyst to selectively occlude and reduce the nitrogen oxides, the method comprising the steps of;

occluding nitrogen oxides by the catalyst when the air-fuel ratio of an air-fuel mixture supplied into the engine combustion chamber is lean;

judging whether the catalyst has stored more than a predetermined amount of nitrogen oxides;

judging whether the engine is operating in a stable manner;

choosing and changing between stratified charge combustion and homogeneous charge combustion; and controlling the air-fuel ratio to make the air-fuel mixture rich only when the stored nitrogen oxides is more than a predetermined amount and the engine operation is judged stable so that the stored nitrogen oxides is reduced and emitted;

wherein the step of judging stability includes judging that the engine is operating in an unstable manner when the difference between the present condition of an actuator, which changes the air intake amount into the combustion chamber, and a required condition of the actuator according to the engine operation is above a predetermined value.

* * * * *